United States Patent [19]

Beveridge, Jr. et al.

[11] 4,096,754
[45] Jun. 27, 1978

[54] REMOVABLE PROBE

[75] Inventors: Wendell Hazelton Beveridge, Jr., Claremont; William Edward Van Over, Monrovia, both of Calif.

[73] Assignee: E. I. Du Pont de Nemours and Company, Wilmington, Del.

[21] Appl. No.: 828,144

[22] Filed: Aug. 26, 1977

[51] Int. Cl.² ........................................ G01L 19/00
[52] U.S. Cl. ........................ 73/432 R; 73/343 R; 73/756
[58] Field of Search .............. 73/420, 432 R, 343 R, 73/375, 374, 86, 432 A; 137/315, 317

[56] References Cited

U.S. PATENT DOCUMENTS 3,983,756  10/1976  Danguillier et al. ............ 73/432 R Primary Examiner—Donald O. Woodiel

[57] ABSTRACT

A removably mounted probe provides access to a fluid enclosure. The front end of the probe has a collar which seats on a beveled shoulder to position the probe relative to the fluid enclosure. The back end of the probe extends through a ball valve and a pair of fittings positioned end-to-end which are held together by a snap coupling. The collar acts to dampen backward movement of the probe when it is released and finally abuts the fittings which limit the probe's movement. The ball valve is closed and the snap coupling removed. The probe may now be fully removed.

8 Claims, 3 Drawing Figures

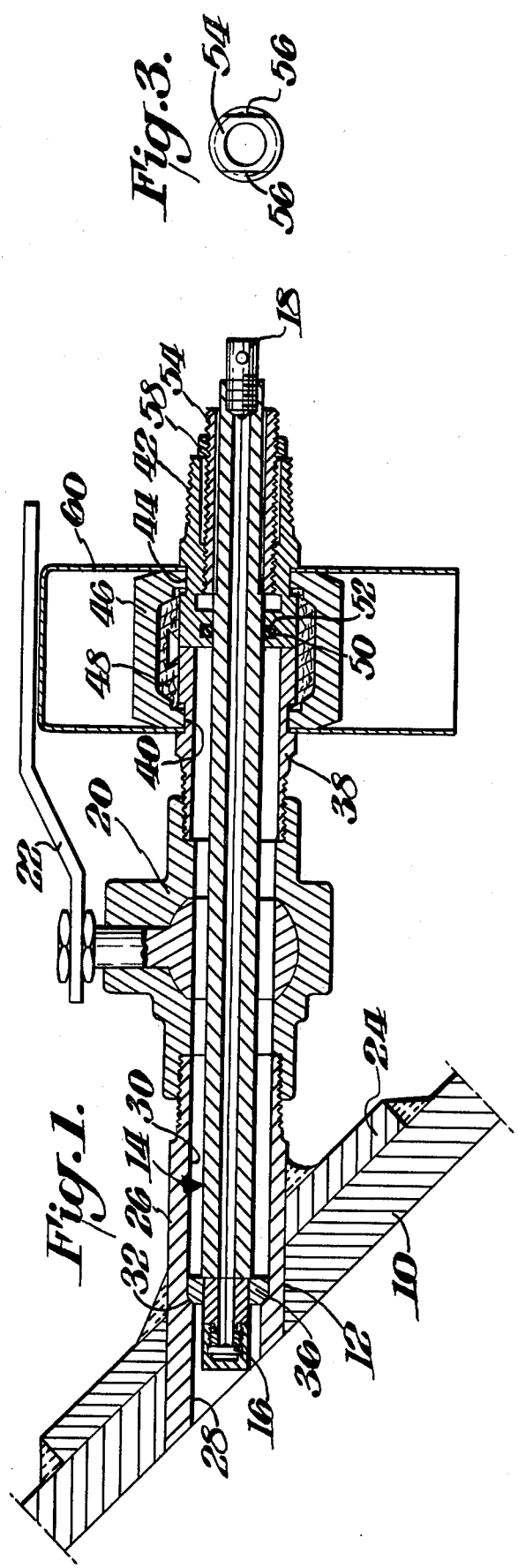
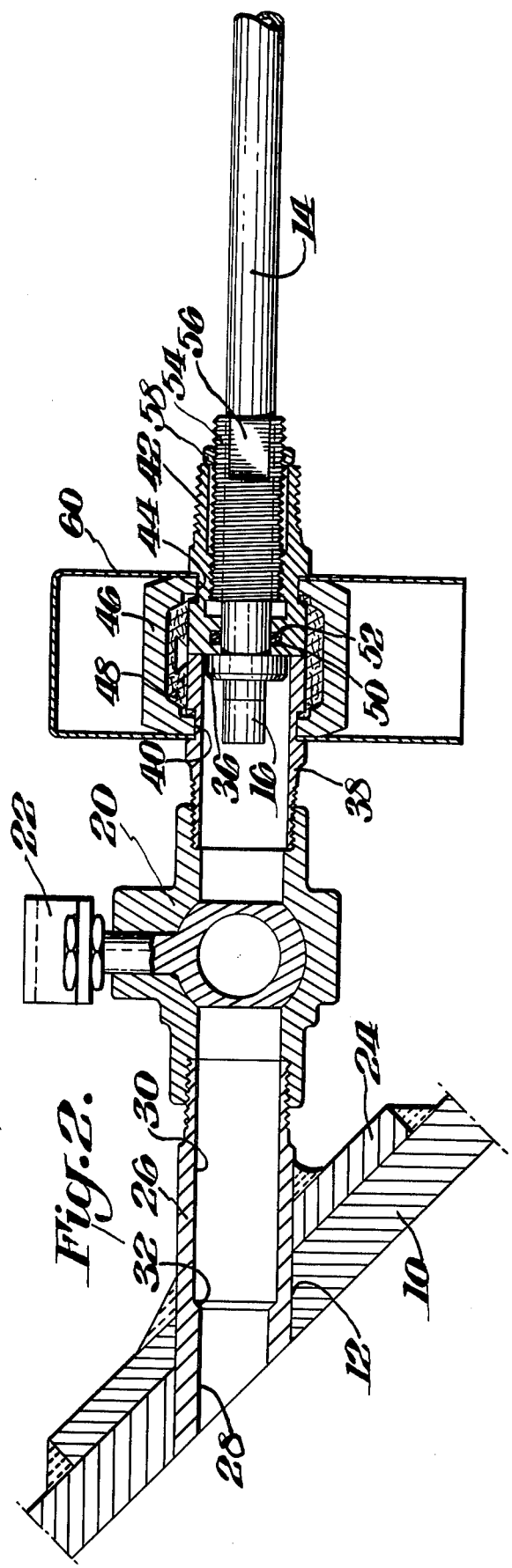

REMOVABLE PROBE

BACKGROUND OF THE INVENTION

This invention relates to a removable probe housing and, more particularly, to a housing in which a probe may be removably mounted for safe removal under operating fluid pressure conditions.

There are various applications in which probes of varying types, i.e., temperature, pressure, ultrasonic transducers, and the like, are used or introduced into fluid enclosures. In each of these cases it often becomes necessary to remove the probe for replacement, cleaning, testing, or similar maintenance. Such removal can become a problem, particularly when the fluid is maintained at a high pressure, since the pressure usually must be relieved before the probe is removed to prevent the unwanted escape of the fluid.

One solution to this problem has been to pass the probe, which is usually enlongated, through a valve. With this arrangement, the probe simply need be partially withdrawn from the fluid enclosure until it has cleared the valve. With the closure of the valve the fluid pressure is contained and the probe withdrawn. This approach, however, is full of problems. For one, it is difficult to properly position the probe within a housing connecting to the fluid enclosure. This is a particular problem in the field of ultransonic transducers where the probe must be accurately positioned relative to the fluid enclosure. Further, because of the fluid pressure, when the probe is released prior to full withdrawal, if extreme care is not taken, the probe can rapidly be propelled from its housing causing injury to the mechanic. Aside from the projectile danger, an immediate problem exists that once the probe is released it tends to be propelled, even over a limited distance, from the enclosure at a high rate of speed. This also can cause injury to the mechanic.

It is, therefore, an object of this invention to provide a removable mounting for a probe which is relatively simple and safe in operation and construction.

SUMMARY OF THE INVENTION

This invention is a mounting for removably introducing a probe into a fluid enclosure. Typically the probe has an enlongated body with a transducer at one end and a coupling or connector at the other. A boss is secured to the fluid enclosure and has a bore and a counter bore forming a positioning shoulder therebetween. A valve is connected to the boss and an extension pipe to the valve and a removable housing to the pipe in abutting fluid-tight end-to-end relation. The housing has a bore of lesser diameter than the internal diameter of the pipe to form a retaining shoulder for the probe. Coupling means secure the pipe and housing in said end-to-end relationship. A bushing is secured in the housing bore such that the bushing, the pipe, the valve and the boss form a continuous passageway for providing the probe access to the enclosure. The probe has a collar contiguous one end for seating on the positioning shoulder when in an inserted position and abutting the retaining shoulder when in a withdrawn position. The other probe end has a step portion which permits the bushing to retain the probe within the conduit during use.

In a preferred embodiment of the invention a safety housing is positioned over the coupling means. The valve has a handle which, when opened, locks the safety housing in position to prevent access to the coupling means. Further, the coupling means is a snap coupling for easy removal of the housing.

With this arrangement, when the bushing is removed, the probe, under the influence of fluid pressure in the fluid enclosure, will be slowly moved outwardly from the fluid enclosure, the collar serving to dampen its movement. This outward movement continues until the collar abuts the removable housing retaining shoulder. Danger of the probe becoming a projectile is greatly reduced. At this point the valve may be closed since the probe has been withdrawn through it. With the closure of the valve, the safety housing may be removed to provide access to the snap coupling. The snap coupling, when removed, permits the removable housing and probe to be totally withdrawn so that whatever probe maintenance or repair work is desired may be easily accomplished. The probe may be reintroduced by reversing the above noted procedure.

BRIEF DESCRIPTION OF THE DRAWINGS

Further advantages and features of this invention will become apparent upon consideration of the following description in which:

FIG. 1 is a side elevation view, partly in cross-section, depicting a removable probe mounting constructed in accordance with a preferred embodiment of this invention with the probe fully inserted;

FIG. 2 is a view of the mounting illustrated in FIG. 1 with the probe withdrawn; and FIG. 3 is an end elevation view of the probe of FIG. 1.

DESCRIPTION OF THE PREFERRED EMBODIMENTS

There may be seen in the figures a fragmentary portion of a pipe wall 10 which may be part of a flow section that is used with an ultransonic transducer probe. This showing is purely illustrative since the mounting of this invention has application with any type of probe or thin elongated structure that must be introduced into an enclosure. This pipe wall 10 is depicted as being bored at 12, typically at a 45° angle to the pipe wall so as to permit the mounting of an ultrasonic transducer thereon to such 45° angle. The mounting of this invention allows the total removal of a probe, in this case the transducer, from the pipe for inspection, cleaning or replacement or other maintenance. As will be described, the transducer has an elongated body depicted at 14 of conventional design having a piezoelectric crystal 16 mounted in the front end and an electrical coupling through a conventional coaxial connector 18 at the back end. Since transducers of this type are conventional they need not be described further since they do not form a part of this invention.

The probe or transducer 14 is mounted to the pipe, of which only the pipe wall 10 is depicted, through a valve 20, that is capable of opening to the full diameter of the probe, such as a ball valve or gate valve. The valve may have an elongated handle 22 for reasons that will be described. As the transducer is pulled out past the valve body, the valve may be closed to seal off the enclosure. The entire transducer can now be removed for inspection and cleaning of the probe's body, face, and the like. As will be described, positive stops are provided to prevent accidental hydraulic expulsion of the transducer from the mounting.

A particular advantage of this arrangement in ultrasonic applications is that since the transducer has access to the interior of the pipe, it has a fluid-wetted face which eliminates many of the sonic problems inherent with many other transducers. For example, clampon and filled epoxy well transducers often have sonic wave distortions which are not present when a fluid-wetted face is used.

To complete the description of the removable probe housing, the pipe wall 10 is strengthened at the place of the bore 12 by the use of a reinforcing plate 24 which is welded to the outside of the pipe wall 10. This plate also serves to aid in correct alignment of the transducer. A boss 26 in turn is welded to the plate 24 before or after it is introduced into the pipe through the bore 12. The boss 26 has an internal bore 28 and a counter bore 30 which form a centering or positioning shoulder 32 for the transducer 14. The positioning (or centering) function is accomplished by shouldering, braising or the like a suitable collar 36 to the front end of the transducer 14. Preferably, the positioning shoulder 32 is beveled to aid in the centering operation.

The exposed end of the boss 26 is threaded to accomodate the valve 20. The passage way through the valve is thus in direct alignment with the bore 28 and the counter bore 30. To complete the passageway for the probe, an extension pipe 38 having a male nib is threaded to the remaining port of the valve 20. The extension pipe 38 has an external annular groove 40 for reasons that will be clear.

A removable cylindrical housing 42 is positioned in end-to-end abutting relationship with the extension pipe 38. It, too, has an external annular groove 44. The two grooves 40 and 44 accomodate a coupling ring or snap coupling 46 which is of conventional type having a snap or over-center type latch and which has a generally U-shaped cross-section, the upright portions of the U engaging the respective grooves 40 and 42. The extension pipe 38 and housing 42 are held in rigid, fluid tight relationship by this coupling. The interior of the snap coupling 46 is provided with a suitable packing or gland 48 to prevent fluid leakage. The interior of the removable housing 42 has an internal groove 50 in which is disposed a suitable seal 52, which is adapted to engage the exterior of the transducer 14 to provide a fluid-tight seal for preventing fluid leakage beyond the housing. Also the interior of the removable housing 42 is of reduced diameter to provide a retaining shoulder for the probe collar. The outer end of the removable housing 42 is internally threaded to accomodate a bushing 54. The bushing may be provided with flats as at 56 to accomodate a wrench. To complete the assembly a locking nut 58 is fitted over the end of the bushing to lock it in position within the housing 42.

It may be seen that the boss 26, the valve 20, the pipe section 38, and the housing 42 provide a continuous access conduit or passageway for the probe into and through the pipe wall 10 of the flow section.

In a preferred embodiment of the invention a safety housing 60 is used, which may be generally rectangular in shape, with cut-outs to permit it to be placed over the snap coupling 46. It may be removed by lifting upwardly (in the drawing). To provide a safety interlock for the safety housing, the valve arm 22, when the valve is in open position, extends over the safety housing 60 to prevent its being lifted or removed. The safety housing may only be lifted when the valve is in a closed position (FIG. 2), i.e., with the handle 22 out of the way and fluid pressure thereby prevented from acting on the mounting.

With the removable probe mounting of this invention, the probe may be removed from the pipe without significant loss of fluid. Such removal of the probe may be accomplished by the following sequence. The lock nut 58 is loosened. With this accomplished, the assembly comprising the transducer or probe 14 and bushing 54 is unscrewed from the housing, using a wrench at the machined flats 58 on the bushing. The transducer may then be withdrawn axially from the mounting until the collar 36 is stopped by the retaining shoulder of the housing 42. Once the transducer 14 clears the valve 20, the valve may be closed to prevent any loss of fluid from the pipe. When the valve is closed, the handle 22 is disengaged from the safety housing by being in the closed position so that the safety housing 26 may be removed and the snap coupling 46 unlatched and removed. Once the snap coupling is removed, the entire removable housing 42 together with the transducer 14 may be lifted away from the remainder of the mounting. The transducer may now be replaced, cleaned, inspected and the like, and when ready, reintroduced by reversing the above-noted procedure.

During reintroduction the collar acts as a guide in cooperation with the internal bore or passageway so that the transducer is returned to the original alignment position. The collar 36 also acts as a positioning stop to ensure the transducer is returned to its original degree of engagement. Another particular advantage of this arrangement is that the beveled positioning shoulder 32 serves to coact with the collar 36 so as to properly center the transducer 14 and more importantly the crystal 16 at the precise location desired to pass the ultrasonic signal into the pipe. By forming the collar to have a relatively close fit within the counter bore 30, and for that matter the entire passageway, it serves to dampen and prevent rapid movement of the transducer 14 during withdrawal. This occurs because the fluid within the passageway must pass around the collar in the relatively thin annular ring-like clearance between the collar and passageway. Further, the collar 36 butts onto the retaining shoulder until the removable housing is removed. This prevents the transducer from being hurled from the mounting as a projectile under the influence of the fluid pressure. The seal 52 together with the packing gland 48 prevents fluid loss during normal operation. Finally, the safety housing 60 prevents actuation of the snap coupling until the valve is closed thereby to prevent further fluid loss.

We claim:

1. A mounting for removably introducing a probe into a fluid enclosure, said mounting including a boss having a bore and a counter bore forming a positioning shoulder therebetween and penetrating said enclosure, a valve connected to said boss, and an extension pipe connected to said valve, comprising:
   a removable housing in fluid tight end-to-end relation with said pipe and having a bore of lesser diameter than the internal diameter of said pipe to form a retaining shoulder therebetween,
   coupling means to secure said pipe and said housing in said end-to-end relationship,
   said housing, said pipe, said valve and said boss forming a continuous passageway for said probe into said enclosure,
   said probe having a collar continguous one end for seating on said positioning shoulder or abutting said retaining shoulder, and means for maintaining said probe collar seated on said positioning shoulder.

2. A mounting for a probe according to claim 1 wherein said positioning shoulder is beveled to position said probe.

3. A mounting for a probe according to claim 2 which also includes a fluid-tight seal for said probe mounted in said housing.

4. A mounting for a probe according to claim 3 which also includes:
   a safety housing to prevent access to said coupling means,
   said valve having a handle which when open locks said safety housing in position to prevent access to said coupling means.

5. A mounting for a probe according to claim 4 wherein said coupling means is a snap coupling for easy removal of said removable housing.

6. A mounting for a probe according to claim 5 wherein said collar has a close fit within said passageway to restrict rapid passage of fluid around said collar, thereby to dampen movement of said probe through said passageway.

7. A mounting for a probe according to claim 1 wherein said retaining means includes a bushing secured in said housing bore, the other end of said probe having a step portion for engaging said bushing such that said bushing retains said probe within said passageway with said collar seated on said positioning shoulder.

8. A mounting for a probe according to claim 1 which also includes:
   a safety housing to prevent access to said coupling means,
   said valve having a handle which when open locks said safety housing in position to prevent access to said coupling means.

* * * * *